US012764575B2

(12) United States Patent
Zhang et al.

(10) Patent No.: US 12,764,575 B2
(45) Date of Patent: Oct. 13, 2026

(54) DIRECT DATA COLLECTION SOLUTION FROM CORE NETWORK TO RADIO ACCESS NETWORK

(71) Applicant: QUALCOMM Incorporated, San Diego, CA (US)

(72) Inventors: Juan Zhang, Beijing (CN); Gavin Bernard Horn, La Jolla, CA (US); Xipeng Zhu, San Diego, CA (US); Rajeev Kumar, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/558,727

(22) PCT Filed: Jul. 29, 2021

(86) PCT No.: PCT/CN2021/109192
§ 371 (c)(1),
(2) Date: Nov. 2, 2023

(87) PCT Pub. No.: WO2023/004671
PCT Pub. Date: Feb. 2, 2023

(65) Prior Publication Data
US 2024/0236732 A1 Jul. 11, 2024

(51) Int. Cl.
*H04W 24/08* (2009.01)

(52) U.S. Cl.
CPC .................................. *H04W 24/08* (2013.01)

(58) Field of Classification Search
CPC ...... H04W 24/08; H04W 24/10; H04L 41/14; H04L 41/16; H04L 41/40
See application file for complete search history.

(56) References Cited

U.S. PATENT DOCUMENTS 10,142,889 B2 * 11/2018 Dao .................... H04L 41/5009
10,917,800 B2 * 2/2021 Rahman .............. H04L 41/5058
(Continued)

FOREIGN PATENT DOCUMENTS

CN 110769455 A 2/2020
CN 111512652 A 8/2020
(Continued)

OTHER PUBLICATIONS

3GPP TS 23.502 V16.0.0 (Mar. 2019), 3rd Generation Partnership Project; Technical Specification Group Services and System Aspects; Procedures for the 5G System; Stage 2 (Release 16) (Year: 2019).*
(Continued)

*Primary Examiner* — Michael A Keller
(74) *Attorney, Agent, or Firm* — Procopio, Cory, Hargreaves & Savitch LLP

(57) ABSTRACT

Aspects presented herein may enable a network entity (e.g., a consumer network entity) to request data and/or analytics (e.g., AI/ML analytics, AI/ML inference, etc.) from another network entity (e.g., a RAN) via a core network or a function associated with the network (e.g., an NWDAF of the core network). In one aspect, a core network entity receives, from a first network entity, an analytics request. The core network entity transmits, to a second network entity, a data collection request based at least in part on the analytics request. The core network entity receives, from the second network entity, a data collection response based on the data collection request. The core network entity transmits, to the first network entity, an analytics response based at least in part on the data collection response.

27 Claims, 13 Drawing Sheets

(56) References Cited

U.S. PATENT DOCUMENTS

| | | | | |
|---|---|---|---|---|
| 11,140,047 | B2 * | 10/2021 | Shan | H04L 41/0895 |
| 11,140,048 | B2 * | 10/2021 | Dao | H04L 43/20 |
| 11,271,795 | B2 * | 3/2022 | Bhalla | H04L 41/0895 |
| 11,917,527 | B2 * | 2/2024 | Chou | H04W 48/18 |
| 12,177,085 | B2 * | 12/2024 | Onno | H04L 41/5058 |
| 12,250,579 | B2 * | 3/2025 | Yao | H04L 43/06 |
| 2014/0269269 | A1 * | 9/2014 | Kovvali | H04W 24/04 370/252 |
| 2016/0239682 | A1 * | 8/2016 | Kapadia | G06F 16/5854 |
| 2017/0078157 | A1 * | 3/2017 | Zhang | H04L 41/5064 |
| 2018/0260665 | A1 * | 9/2018 | Zhang | G06F 18/22 |
| 2019/0174320 | A1 * | 6/2019 | Kodaypak | H04W 24/02 |
| 2019/0222489 | A1 * | 7/2019 | Shan | H04M 15/66 |
| 2019/0356558 | A1 * | 11/2019 | Han | H04L 41/14 |
| 2021/0014141 | A1 | 1/2021 | Patil et al. | |
| 2021/0021494 | A1 * | 1/2021 | Yao | H04L 41/0631 |
| 2021/0022022 | A1 * | 1/2021 | Guo | H04M 15/66 |
| 2021/0068170 | A1 * | 3/2021 | Sadhu | H04W 16/18 |
| 2021/0160890 | A1 * | 5/2021 | Selvanesan | H04W 72/542 |
| 2021/0176649 | A1 | 6/2021 | Rahman et al. | |
| 2022/0038554 | A1 * | 2/2022 | Merwaday | H04L 45/64 |
| 2022/0167236 | A1 * | 5/2022 | Melodia | H04W 28/24 |
| 2022/0408377 | A1 * | 12/2022 | Kotaru | H04W 52/241 |
| 2023/0037701 | A1 * | 2/2023 | Pinheiro | H04W 88/085 |
| 2023/0164598 | A1 * | 5/2023 | Yao | H04W 24/04 370/252 |
| 2023/0209109 | A1 * | 6/2023 | Giladi | H04L 65/70 725/109 |
| 2024/0306011 | A1 * | 9/2024 | Zhang | H04L 41/147 |

FOREIGN PATENT DOCUMENTS

| | | | | | |
|---|---|---|---|---|---|
| CN | 112189355 | A | | 1/2021 | |
| CN | 110312279 | B | * | 3/2021 | H04W 4/029 |
| WO | WO-2017193970 | A1 | * | 11/2017 | H04W 72/543 |
| WO | WO-2019197467 | A1 | * | 10/2019 | H04L 41/14 |
| WO | WO-2020143373 | A1 | * | 7/2020 | H04L 43/20 |
| WO | 2021032497 | A1 | | 2/2021 | |
| WO | 2021032498 | A1 | | 2/2021 | |
| WO | 2021089158 | A1 | | 5/2021 | |
| WO | WO-2022175188 | A1 | * | 8/2022 | H04L 41/142 |

OTHER PUBLICATIONS

3 GPP TS 23.288 V 16.4.0 (Jul. 2020) "3rd Generation Partnership Project; Technical Specification Group Services and System Aspects; Architecture enhancements for 5G System (5GS) to support network data analytics services (Release 16);" (Year: 2020).*

3GPP TS 28.550 V16.7.0 (Dec. 2020), 3rd Generation Partnership Project; Technical Specification Group Services and System Aspects; Management and orchestration; Performance assurance (Release 16) (Year: 2020).*

3GPP TS 28.552 V16.10.0 (Jun. 2021), 3rd Generation Partnership Project; Technical Specification Group Services and System Aspects; Management and orchestration; 5G performance measurements (Release 16) (Year: 2021).*

3GPP TS 29.510 V17.2.0 (Jun. 2021), 3rd Generation Partnership Project; Technical Specification Group Core Network and Terminals; 5G System; Network Function Repository Services; Stage 3 (Release 17) (Year: 2021).*

3GPP TS 37.320 V16.4.0 (Mar. 2021), 3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of . . . (Year: 2021).*

3GPP TR 23.791: "3rd Generation Partnership Project, Technical Specification Group Services and System Aspects, Study of Enablers for Network Automation for 5G (Release 16)", V1.0.0 (Sep. 2018), 66 Pages, Sep. 30, 2018 (Sep. 30, 2018), Sections 6.1.1, 6.6.

Huawei, et al., "Miscellaneous Corrections for TR 23.700-91", 3GPP TSG SA2 Meeting #141E e-meeting, S2-2008016 (revision of S2-2006908r02), Elbonia, 20201012-20201023, Oct. 2020 (Oct. 23, 2020), Section 6.4.1.4.1.

International Search Report and Written Opinion—PCT/CN2021/109192—ISA/EPO—Apr. 27, 2022.

3GPP: "3rd Generation Partnership Project; Technical Specification Group Services and System Aspects, Study on Enablers for Network Automation for the 5G System (5GS), Phase 2 (Release 17)", 3GPP TR 23.700-91 V2.0.0, Nov. 2020, 3rd Generation Partnership Project (3GPP), Mobile Competence Centre, 650, Route Des Lucioles, F-06921, Sophia-Antipolis Cedex, France, Nov. 30, 2020, 378 Pages, XP051961724, pp. 28, 37-39, 45, 54, 74, 94-99, 109-110, 132-137, 148, 171-173, 182-189, 219-224, 241-242, 251-259, 263, 271, 292, 368.

Supplementary European Search Report—EP21951280—Search Authority—Munich—Feb. 24, 2025.

* cited by examiner

DIRECT DATA COLLECTION SOLUTION FROM CORE NETWORK TO RADIO ACCESS NETWORK

CROSS-REFERENCE TO RELATED APPLICATIONS

This application is a National Stage Application filed under 35 U.S.C. § 371 of PCT International Application Serial No. PCT/CN2021/109192 entitled "DIRECT DATA COLLECTION SOLUTION FROM CORE NETWORK TO RADIO ACCESS NETWORK," and filed on Jul. 29, 2021, which is expressly incorporated by reference herein in its entirety.

TECHNICAL FIELD

The present disclosure relates generally to communication systems, and more particularly, to a wireless communication involving data collection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a first network entity, an analytics request. The apparatus transmits, to a second network entity, a data collection request based at least in part on the analytics request. The apparatus receives, from the second network entity, a data collection response based on the data collection request. The apparatus transmits, to the first network entity, an analytics response based at least in part on the data collection response.

In an aspect of the disclosure, a method, a computer-readable medium, and an apparatus are provided. The apparatus receives, from a core network entity, a data collection request based at least in part on an analytics request. The apparatus transmits, to the core network entity, a data collection response based on the data collection request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
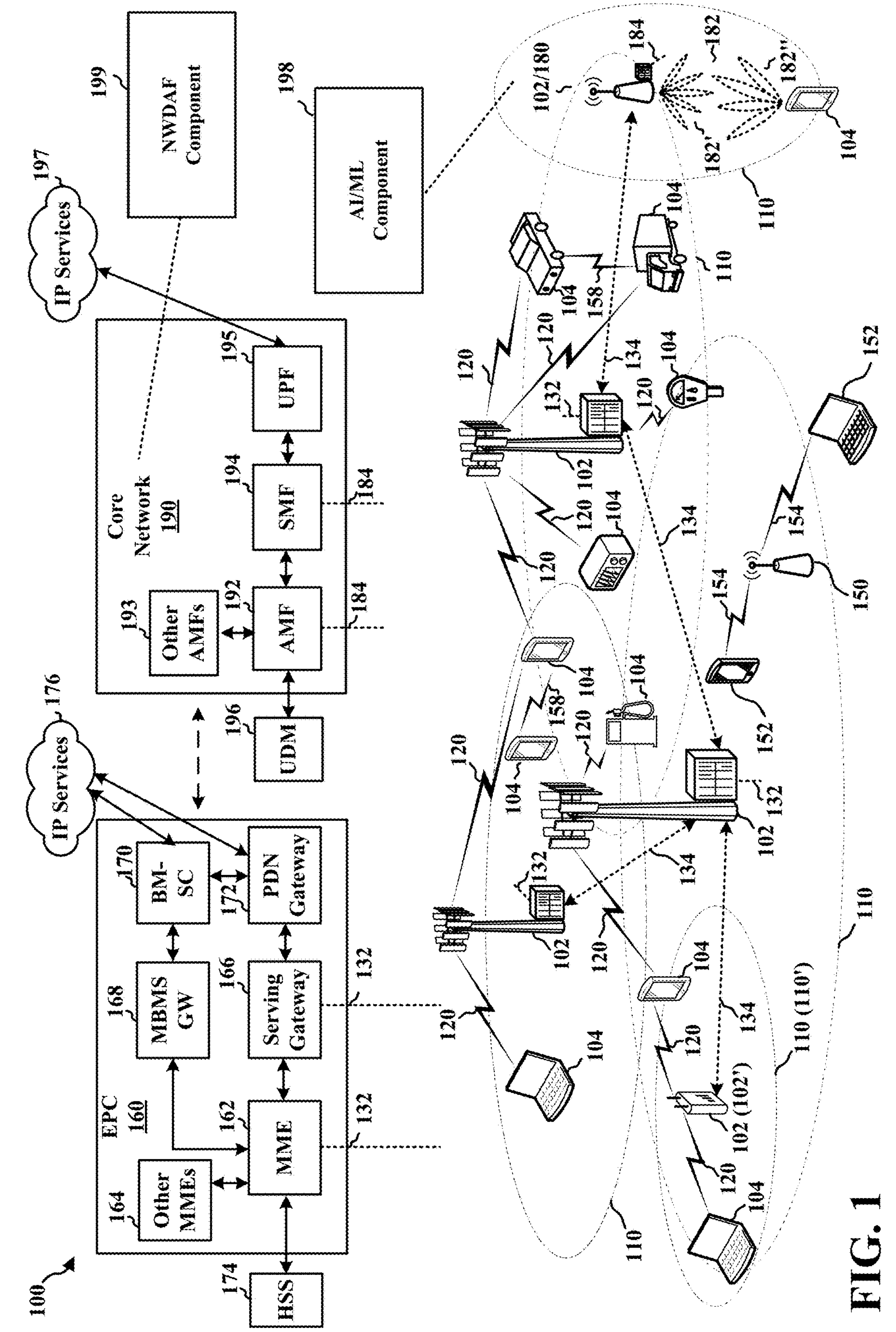
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc., of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a core network and a RAN to be coordinated with regards to data collection and/or AI/ML analytics. Aspects presented herein may enable a network entity (e.g., a consumer network entity) to request data and/or analytics (e.g., AI/ML analytics, AI/ML inference, etc.) from another network entity (e.g., a RAN) via a core network or a function associated with the network (e.g., an NWDAF of the core network).

In certain aspects, the core network 190 may include an NWDAF component 199 configured to coordinate data collection and/or AI/ML analytics with another network entity (e.g., a RAN). In one configuration, the NWDAF component 199 may receive, from a first network entity, an analytics request. In such configuration, the NWDAF component 199 may transmit, to a second network entity, a data collection request based at least in part on the analytics request. In such configuration, the NWDAF component 199 may receive, from the second network entity, a data collection response based on the data collection request. In such configuration, the NWDAF component 199 may transmit, to the first network entity, an analytics response based at least in part on the data collection response.

In certain aspects, a network entity (e.g., the base station 180) may include an AI/ML component 198 configured to coordinate data collection and/or AI/ML analytics with a core network entity (e.g., an NWDAF). In one configuration, the AI/ML component 198 may receive, from a core network entity, a data collection request based at least in part on an analytics request. In such configuration, the AI/ML component 198 may transmit, to the core network entity, a data collection response based on the data collection request.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
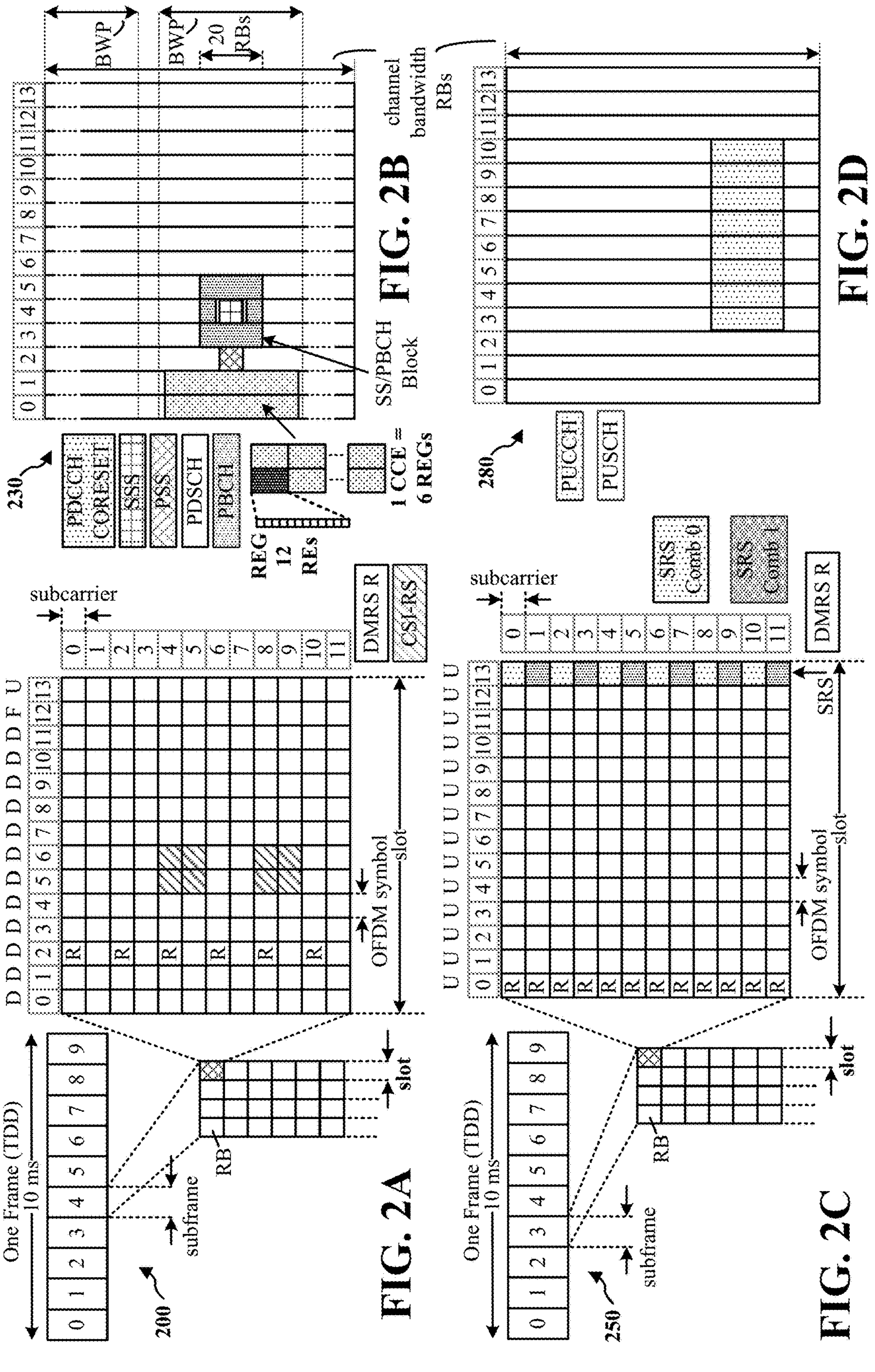
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
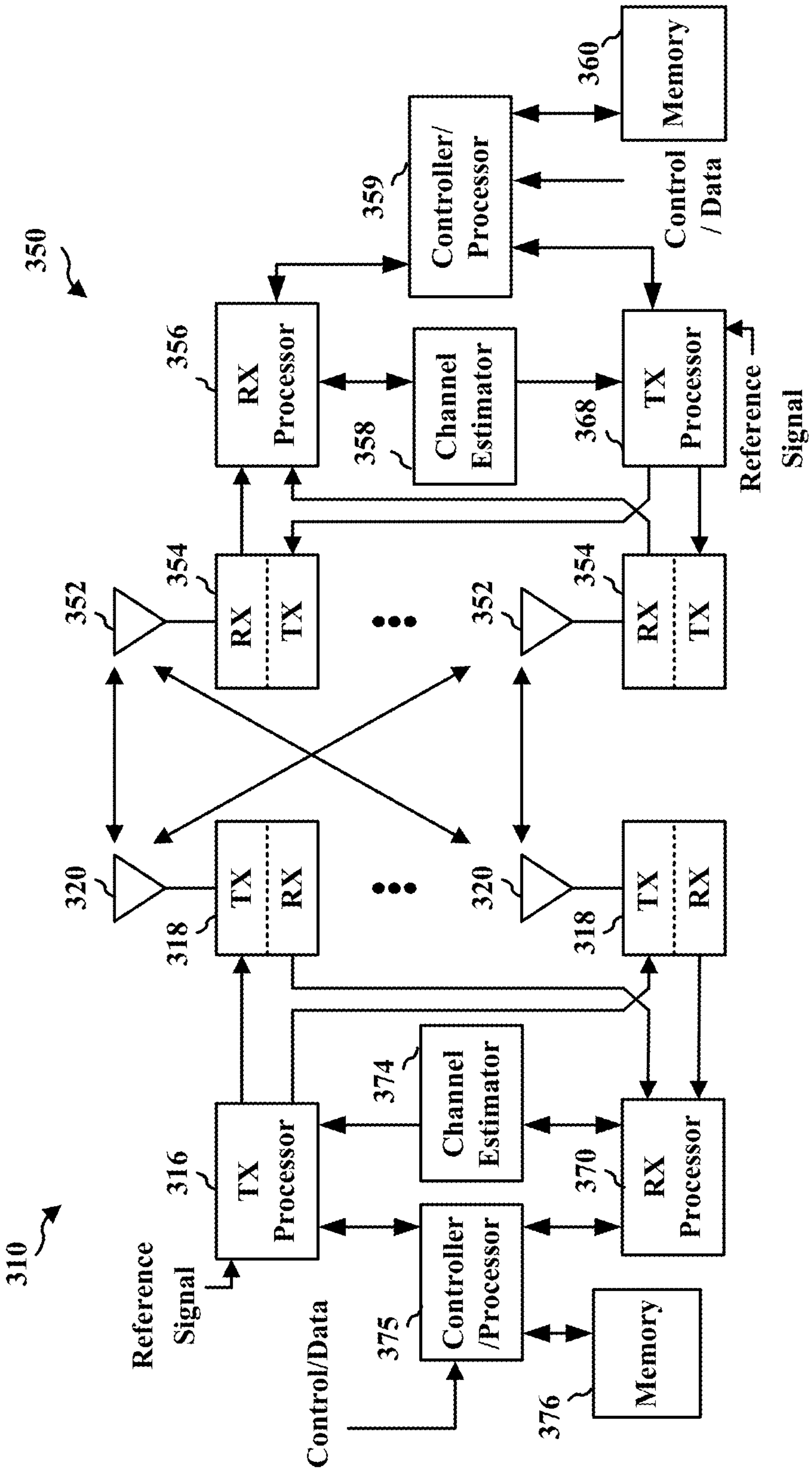
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

In one example, at least one of the TX processor 368, the RX processor 356, and the controller/processor 359 may be configured to perform aspects in connection with the NWDAF component 199 of FIG. 1. In another example, at least one of the TX processor 368, the RX processor 356, and the controller/processor 359 may be configured to perform aspects in connection with the AI/ML component 198 of FIG. 1. In another example, at least one of the TX processor 368, the RX processor 356, and the controller/processor 359 may be configured to perform aspects in connection with both the NWDAF component 199 and the AI/ML component 198 of FIG. 1.

To improve communication performance and reliability, a core network (e.g., a 5G core (5GC) network) may be associated or implemented with one or more machine learning (ML) functions and/or artificial intelligence (AI) functions, where the ML functions and/or the AI functions may enable the core network to learn and/or to estimate behaviors of the core network. For example, the core network may use the ML functions and/or the AI functions to learn communication traffic patterns, and the core network may use the learned communication traffic patterns for detecting anomalies in the network traffic, or to improve the resources/bandwidth allocation for the network traffic. In another example, the AI/ML functions may provide the prediction or holistic decision for radio access network (RAN) node(s) to perform optimization for the network or the communication, such as load balancing, mobility optimization, and/or energy saving, etc. For example, a 5GC network may be associated with a network data analytics function (NWDAF), where a network operator may implement ML/AI-based data analytics methodologies or integrate third-party solutions to its network. The 5GC network may use the NWDAF to collect data from one or more network entities, to analyze the collected data based on AI/ML (e.g., the NWDAF may perform an AI/ML inference to obtain an analytics result for the collected data), and/or to output the collected data and/or the analytics result to one or more network entities (which may be referred to as "data exposure"), etc.

Figure 4:
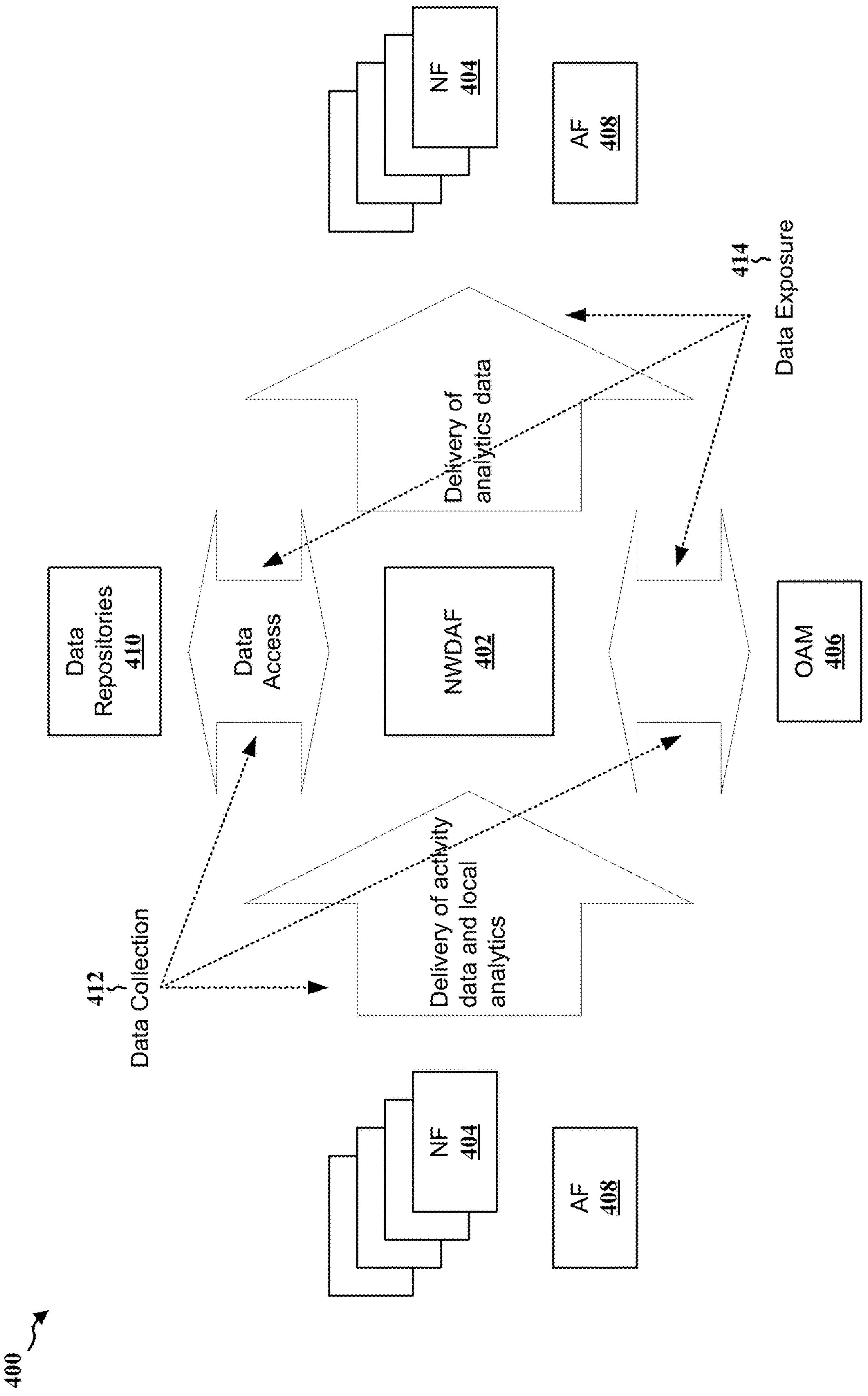
FIG. 4 is a diagram illustrating an example framework of a network automation depicting a network data analytics function (NWDAF) collecting data from an operations, administration and maintenance (OAM), application functions (AFs) and core network functions (NFs) in accordance with various aspect of the present disclosure.

FIG. 4 is a diagram 400 illustrating an example framework of a network automation depicting an NWDAF collecting data from an operations, administration and maintenance (OAM), application functions (AFs) and core network functions (NFs) in accordance with various aspect of the present disclosure. An NWDAF 402 may be used for data collection and data analytics in a centralized manner, and the NWDAF 402 may be used for analytics for one or more network slices. For example, when certain analytics are to be performed by a network function (NF) (e.g., one NF of the NFs 404) independently, an NWDAF instance specific to that analytic maybe collocated with the NF. The data utilized by the NF as input to analytics in this case may be made available to allow for a centralized NWDAF deployment. In some examples, one or more NFs. e.g., NFs 404, and/or an OAM 406 may decide how to use the data analytics provided by the NWDAF 402 to improve the network performance. The NFs 404 may include a mobility management function (AMF), a session management function (SMF), a policy control function (PCF), a unified data repository (UDR), a network exposure function (NEF), etc. The NWDAF 402 may utilize existing service based interfaces to communicate with the NFs 404 and the OAM 406. In another example, an NF may expose the result of the data analytics to any consumer NF utilizing a service based interface. The interactions between NFs 404 and the NWDAF 402 may take place in a local public land mobile network (PLMN), where the NFs 404 and the NWDAF 402 may belong to the same PLMN.

In some examples, depending on network deployments and on one or more AF(s), an AF 408 may exchange information with the NWDAF 402 via an NEF, or use service based interfaces to access the NWDAF 402 directly. In addition, the NWDAF 402 may accesses network data from one or more data repositories 410 (e.g., UDRs). For some of the NFs 404, the NWDAF 402 may utilize service based interfaces to communicate with these NFs 404 to get network data and dedicated analytics. Based on the data collection, the NWDAF 402 may perform data analysis and provides the analytical result to the AF 408, the NFs 404, and the OAM 406, where the output of the analytics provided to the AF 408, the NFs 404, and/or the OAM 406 by the NWDAF 402 and vice versa may be defined depending on selected solutions for issues. In other words, for an NWDAF enhanced in enablers for network automation (cNA) in core network, as shown at 412, data collection may be provided by NFs of a core network (e.g., AMF, SMF, PCF, UDR, NEF, etc.), AFs, an OAM, and/or data repositories, etc., and as shown at 414, data exposure may be on demand provision of analytic (e.g., may be provided) to one or more NFs of the core network, such as the AF, the OAM, and/or the data repositories, etc.

In some scenarios, a core network and a RAN may each define an AI/ML platform and support specific AI/ML analytics/inferences, where the data collection between the core network and the RAN may not be coordinated. For examples, a core network may not be able to use data collected by a RAN for performing AI/ML analytics/inferences if there is no coordination between the core network and the RAN.

Aspects presented herein may enable a core network and a RAN to be coordinated with regards to data collection and/or AI/ML analytics. Aspects presented herein may enable a network entity (e.g., a consumer network entity) to request data and/or analytics (e.g., AI/ML analytics, AI/ML inference, etc.) from another network entity (e.g., a RAN) via a core network or a function associated with the network (e.g., an NWDAF of the core network).

Figure 5:
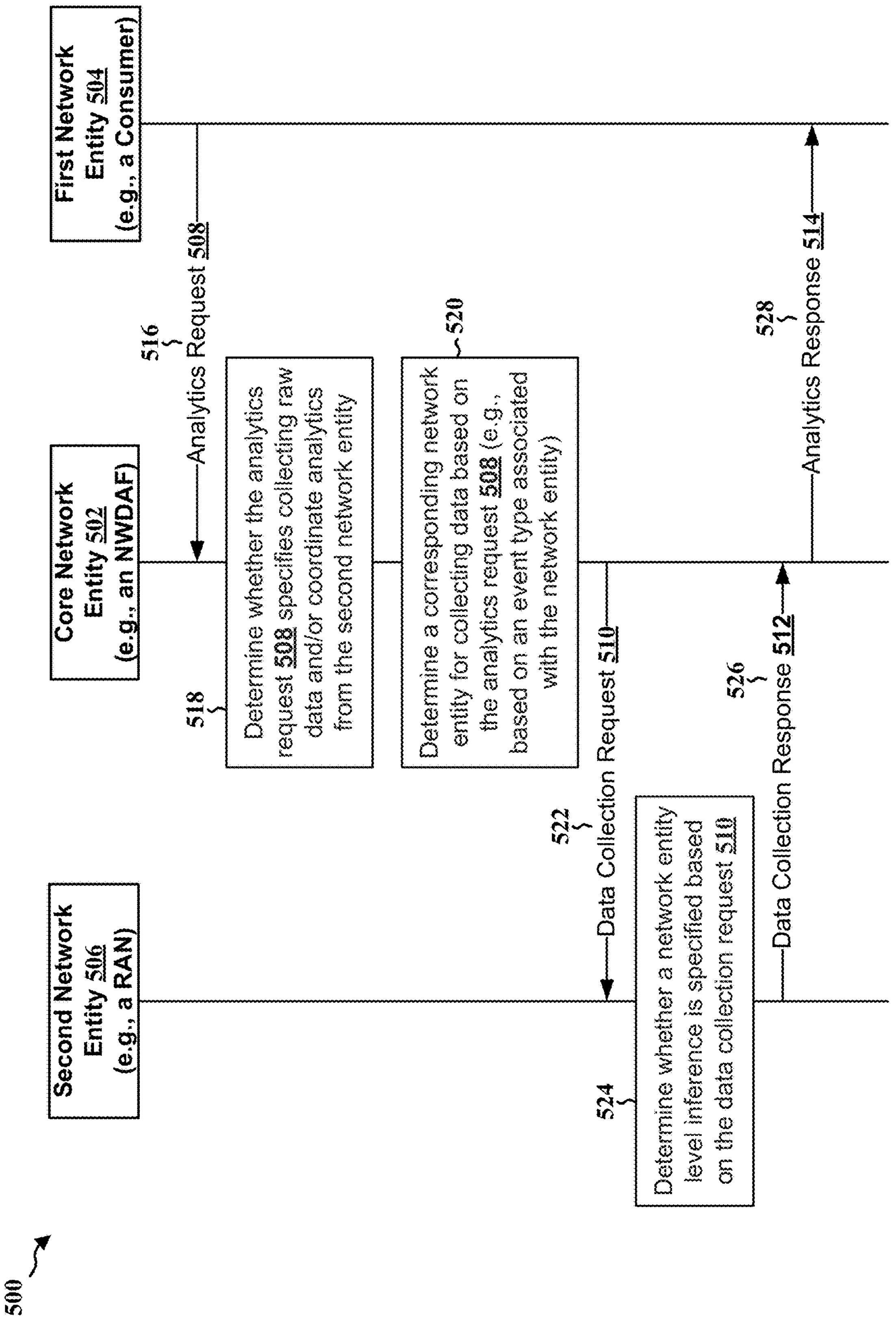
FIG. 5 is a communication flow illustrating an example coordination between a core network and a radio access network (RAN) in accordance with various aspects of the present disclosure.

FIG. 5 is a communication flow 500 illustrating an example coordination between a core network and a RAN in accordance with various aspects of the present disclosure. Aspects presented herein may enable a consumer network entity to request analytics from a RAN via a core network. The numberings associated with the communication flow 500 do not specify a particular temporal order and are merely used as references for the communication flow 500.

At 516, a first network entity 504, which may be referred to as a consumer network entity, may transmit an analytics request 508 to a core network entity 502 (e.g., an NWDAF) for requesting analytics. In one example, the first network entity 504 may be associated with one or more of an AMF, an SMF, a PCF, a UDR, an NEF, one or more AFs, an OAM entity, and/or one or more data repositories, etc. The analytics request 508 may specify one or more types of analytics to be performed, such as a load balancing associated with a network, a mobility optimization for a network, and/or an energy saving for a network, etc. As such, the first network entity 504 may include one or more analytics identifier (IDs) and/or model IDs in the analytics request 508, where each analytics ID or model ID may be associated with a type of analytics or an analytics model which may be performed/ applied (e.g., by a core network or a RAN). In some examples, as an alternative or additionally, the analytics request 508 may request raw data collection instead of analytics, where the analytics request 508 may include one or more parameters associated with the raw data collection (e.g., types of data to be collected, an amount of data to be collected, a time range for data to be collected, etc.).

In one aspect of the present disclosure (Option 1), at 518, based at least in part on the analytics request 508 received, the core network entity 502 may determine whether the analytics request 508 specifies collecting raw data and/or coordinate analytics (e.g., AI/ML inference associated with the raw data) from a second network entity 506, which may be a RAN. For example, if the analytics request 508 includes one or more analytics IDs and/or model IDs, the core network entities may determine that the analytics request 508 specifies collecting coordinate analytics. On the other hand, if the analytics request 508 includes one or more parameters associated with raw data collection, the core network entities may determine that the analytics request 508 specifies collecting raw data. In another example, the core network entity 502 may determine whether the second network entity 506 has capabilities to provide coordinate analytics, and the core network entity 502 may determine whether the analytics request 508 specifies collecting raw data, coordinate analytics, or both based on the determination.

In some examples, the analytics request 508 may include an event type, where the event type may be associated with a registration area, a specific network slice, a specific UE, and/or a group of UEs, etc. In other words, the analytics request 508 may indicate a target, a parameter, a range, or a limit in which the coordinate analytics or the raw data is to be collected. For example, the analytics request 508 may request coordinate analytics and/or raw data related to load balancing for a group of UEs, and/or the analytics request 508 may request coordinate analytics and/or raw data related to energy consumption/saving for a specific UE, etc. In some examples, the event type may be based on (or defined by) information from a local configuration, a network repository function (NRF), or an OAM entity, etc.

At 520, the core network entity 502 may determine a corresponding network entity for collecting data based on the analytics request 508 (e.g., based on the event type associated with the network entity). For example, if the analytics request 508 indicates coordinate analytics or raw data associated with a group of UEs is to be collected, the core network entity 502 may determine that the second network entity 506 is a correct or suitable entity for collecting such coordinate analytics or raw data.

At 522, if the core network entity 502 determines that the analytics request 508 specifies collecting raw data and/or coordinate analytics from the second network entity 506 (e.g., at 518) and/or that the second network entity 506 is a suitable candidate for collecting the data (e.g., at 520), the core network entity 502 may transmit a data collection request 510 to the second network entity 506. The core network entity 502 may include one or more analytics/model IDs and/or one or more parameters associated with raw data collection in the data collection request 510, which may correspond to the analytics/model ID(s) and/or the parameter(s) associated with raw data collection received from the first network entity 504 in the analytics request 508. As such, based at least in part on the analytics/model ID(s) and/or the parameter(s) associated with the raw data collection, the second network entity 506 may determine whether to transmit coordinate analytics and/or raw data in response. For example, if the core network entity 502 determines that raw data is to be collected from the second network entity 506 (e.g., the analytics request 508 does not request coordinate analytics to be collected), the core network entity 502 may include the one or more parameters associated with the raw data in the data collection request 510. In another example, if the core network entity 502 determines that coordinate analytics is to be collected from the second network entity 506 (e.g., the analytics request 508 does not request raw data to be collected), the core network entity 502 may include the corresponding analytics/model ID(s) received from the first network entity 504 in the data collection request 510. The core network entity 502 may include both the analytics/model ID(s) and parameters for the raw data if both the coordinate analytics and the raw data are requested.

In another aspect of the present disclosure (Option 2), the core network entity 502 may be configured not to determine whether the analytics request 508 specifies collecting raw data and/or coordinate analytics from the second network entity 506 (e.g., the step described in connection with 518 may be skipped). As an alternative, the core network entity 502 may include or forward the analytics/model ID(s) and/or the parameter(s) associated with raw data collection in the analytics request 508 to the second network entity 506 via the data collection request 510 (e.g., after determining the second network entity 506 is a suitable candidate).

Then, at 524, the second network entity 506 may determine whether a network entity level inference (e.g., a RAN level inference) is specified based on the data collection request 510. If the second network entity 506 determines that a network entity level inference (e.g., a RAN level inference) is specified, the second network entity 506 may initiate the second entity level inference accordingly (e.g., the second network entity 506 may perform AI/ML inference on the request data), and the second network entity 506 may transmit the second entity level inference (e.g., the coordinate analytics) to the core network entity 502. On the other hand, if the second network entity 506 determines that the network entity level inference is not specified, the second network entity may transmit raw data to the core network entity 502.

In other words, the core network entity 502 may determine whether the analytics request 508 specifies collecting raw data and/or coordinate analytics from the second network entity 506 (e.g., Option 1), and the core network entity 502 may indicate its determination to the second network entity 506 in the data collection request 510 such that the second network entity 506 knows whether to transmit coordinate analytics or raw data or both; or as an alternative, the core network entity 502 may forward the analytics request 508 or parameters/analytics IDs in the analytics request 508 to the second network entity 506 (e.g., Option 2), and the core network entity 502 may leave the second network entity 506 to determine whether the analytics request 508 specifies collecting raw data or coordinate analytics from the second network entity 506 (e.g., based on the parameters/analytics IDs in the data collection request 510).

At 526, in response to the data collection request 510, the second core network entity may transmit a data collection response 512 to the core network entity 502, where the data collection response 512 may include the coordinate analytics (e.g., AI/ML inference of the raw data) and/or the raw data depending on the data collection request 510 and/or depending on whether the network entity level inference is specified (e.g., determined by the second network entity 506 at 524).

At 528, the core network entity 502 may transmit an analytics response 514 to the first network entity 504 based at least in part on the data collection response 512 received. For example, the analytics response 528 may include coordinate analytics and/or raw data in which the core network entity 502 received from the second network entity 506.

Figure 6:
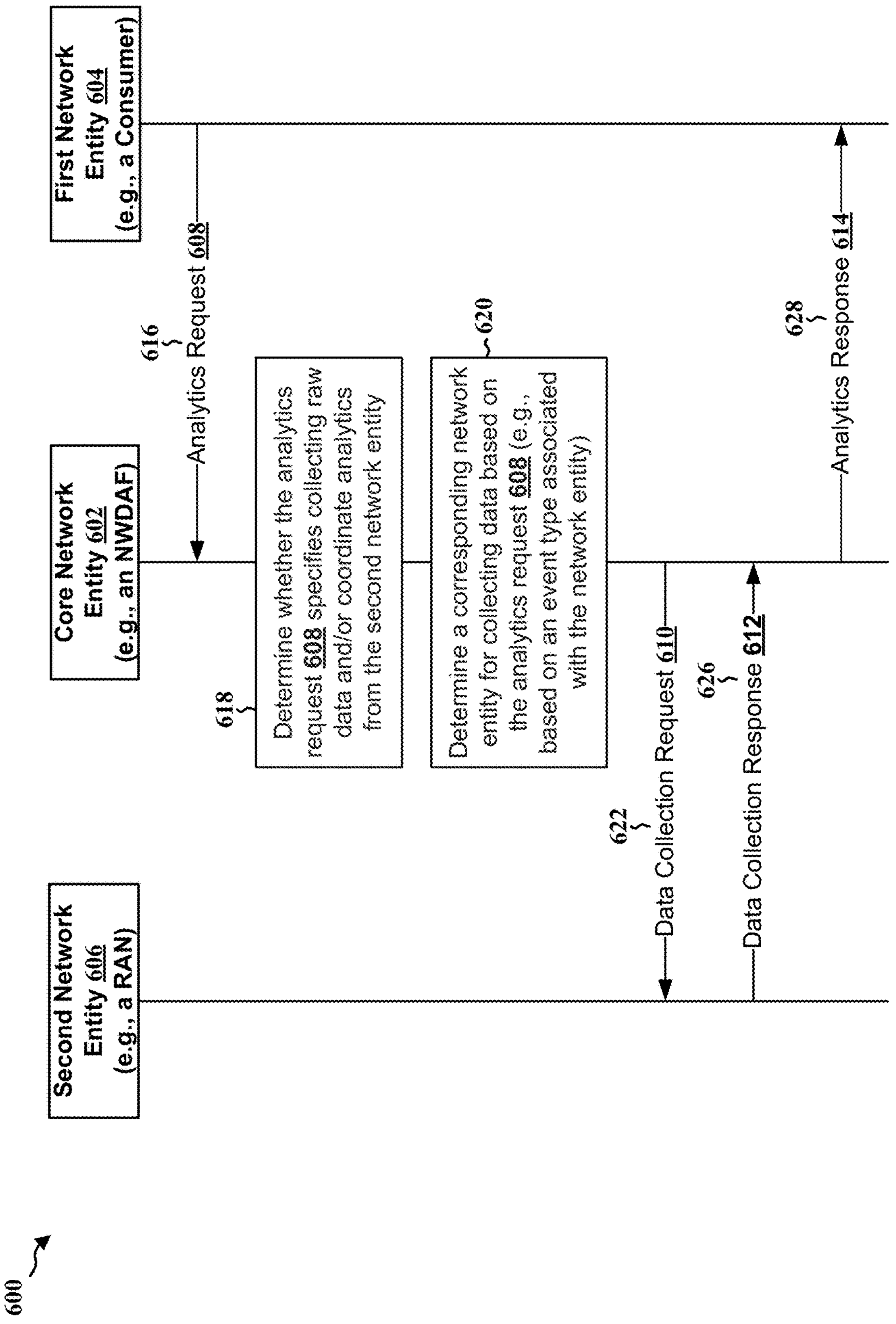
FIG. 6 is a communication flow illustrating an example coordination between a core network and a RAN in which the core network determines whether analytics request specifies coordinate analytics or raw data in accordance with various aspects of the present disclosure.

FIG. 6 is a communication flow 600 illustrating an example coordination between a core network and a RAN in which the core network determines whether analytics request specifies coordinate analytics or raw data in accordance with various aspects of the present disclosure. Aspects presented herein may enable a consumer network entity to request analytics from a RAN via a core network. The numberings associated with the communication flow 600 do not specify a particular temporal order and are merely used as references for the communication flow 600.

At 616, a first network entity 604, which may be referred to as a consumer network entity, may transmit an analytics request 608 to a core network entity 602 (e.g., an NWDAF) for requesting analytics. In one example, the first network entity 604 may be associated with one or more of an AMF, an SMF, a PCF, a UDR, an NEF, one or more AFs, an OAM entity, and/or one or more data repositories, etc. The analytics request 608 may specify one or more types of analytics to be performed, such as a load balancing associated with a network, a mobility optimization for a network, and/or an energy saving for a network, etc. As such, the first network entity 604 may include one or more analytics IDs and/or model IDs in the analytics request 608, where each analytics ID or model ID may be associated with a type of analytics or an analytics model which may be performed/applied (e.g., by a core network or a RAN). In some examples, as an alternative or additionally, the analytics request 608 may request raw data collection instead of analytics, where the analytics request 608 may include one or more parameters associated with the raw data collection (e.g., types of data to be collected, an amount of data to be collected, a time range for data to be collected, etc.).

At 618, based at least in part on the analytics request 608 received, the core network entity 602 may determine whether the analytics request 608 specifies collecting raw data and/or coordinate analytics (e.g., AI/ML inference associated with the raw data) from a second network entity 606, which may be a RAN. For example, if the analytics request 608 includes one or more analytics IDs and/or model IDs, the core network entities may determine that the analytics request 608 specifies collecting coordinate analytics. On the other hand, if the analytics request 608 includes one or more parameters associated with raw data collection, the core network entities may determine that the analytics request 608 specifies collecting raw data. In another example, the core network entity 602 may determine whether the second network entity 606 has capabilities to provide coordinate analytics, and the core network entity 602 may determine whether the analytics request 608 specifies collecting raw data, coordinate analytics, or both based on the determination.

In some examples, the analytics request 608 may include an event type, where the event type may be associated with a registration area, a specific network slice, a specific UE, and/or a group of UEs, etc. In other words, the analytics request 608 may indicate a target, a parameter, a range, or a limit in which the coordinate analytics or the raw data is to be collected. For example, the analytics request 608 may request coordinate analytics and/or raw data related to load balancing for a group of UEs, and/or the analytics request 608 may request coordinate analytics and/or raw data related to energy consumption/saving for a specific UE, etc. In some examples, the event type may be based on (or defined by) information from a local configuration, an NRF, or an OAM entity, etc.

At 620, the core network entity 602 may determine a corresponding network entity for collecting data based on the analytics request 608 (e.g., based on the event type associated with the network entity). For example, if the analytics request 608 indicates coordinate analytics or raw data associated with a group of UEs is to be collected, the core network entity 602 may determine that the second network entity 606 is a correct or suitable entity for collecting such coordinate analytics or raw data.

At 622, if the core network entity 602 determines that the analytics request 608 specifies collecting raw data and/or coordinate analytics from the second network entity 606 (e.g., at 618) and/or that the second network entity 606 is a suitable candidate for collecting the data (e.g., at 620), the core network entity 602 may transmit a data collection request 610 to the second network entity 606. The core network entity 602 may include one or more analytics/model IDs and/or one or more parameters associated with raw data collection in the data collection request 610, which may correspond to the analytics/model ID(s) and/or the parameter(s) associated with raw data collection received from the first network entity 604 in the analytics request 608. As such, based at least in part on the analytics/model ID(s) and/or the parameter(s) associated with the raw data collection, the second network entity 606 may determine whether to transmit coordinate analytics and/or raw data in response. For example, if the core network entity 602 determines that raw data is to be collected from the second network entity 606 (e.g., the analytics request 608 does not request coordinate analytics to be collected), the core network entity 602 may include the one or more parameters associated with the raw data in the data collection request 610. In another example, if the core network entity 602 determines that coordinate analytics is to be collected from the second network entity 606 (e.g., the analytics request 608 does not request raw data to be collected), the core network entity 602 may include the corresponding analytics/model ID(s) received from the first network entity 604 in the data collection request 610. The core network entity 602 may include both the analytics/model ID(s) and parameters for the raw data if both the coordinate analytics and the raw data are requested.

At 626, in response to the data collection request 610, the second core network entity may transmit a data collection response 612 to the core network entity 602, where the data collection response 612 may include the coordinate analytics (e.g., AI/ML inference of the raw data) and/or the raw data depending on the data collection request 610.

At 628, the core network entity 602 may transmit an analytics response 614 to the first network entity 604 based at least in part on the data collection response 612 received. For example, the analytics response 628 may include coordinate analytics and/or raw data in which the core network entity 602 received from the second network entity 606.

Figure 7:
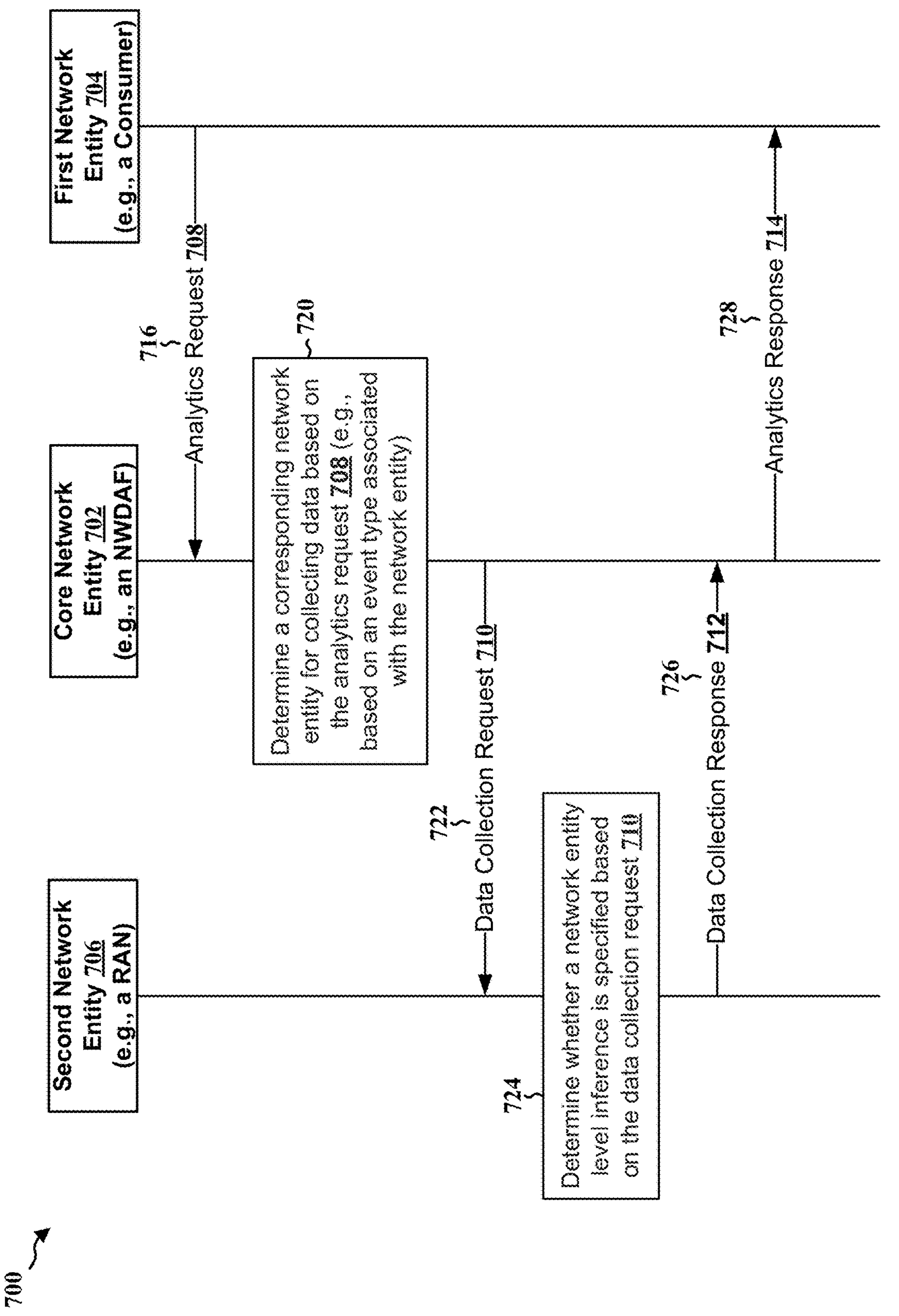
FIG. 7 is a communication flow illustrating an example coordination between a core network and a RAN in which the RAN determines whether a RAN level inference is specified in accordance with various aspects of the present disclosure.

FIG. 7 is a communication flow 700 illustrating an example coordination between a core network and a RAN in which the RAN determines whether a RAN level inference is specified in accordance with various aspects of the present disclosure. Aspects presented herein may enable a consumer network entity to request analytics from a RAN via a core network. The numberings associated with the communication flow 700 do not specify a particular temporal order and are merely used as references for the communication flow 700.

At 716, a first network entity 704, which may be referred to as a consumer network entity, may transmit an analytics request 708 to a core network entity 702 (e.g., an NWDAF) for requesting analytics. In one example, the first network entity 704 may be associated with one or more of an AMF, an SMF, a PCF, a UDR, an NEF, one or more AFs, an OAM entity, and/or one or more data repositories, etc. The analytics request 708 may specify one or more types of analytics to be performed, such as a load balancing associated with a network, a mobility optimization for a network, and/or an energy saving for a network, etc. As such, the first network entity 704 may include one or more analytics IDs and/or model IDs in the analytics request 708, where each analytics ID or model ID may be associated with a type of analytics or an analytics model which may be performed/applied (e.g., by a core network or a RAN). In some examples, as an alternative or additionally, the analytics request 708 may request raw data collection instead of analytics, where the analytics request 708 may include one or more parameters associated with the raw data collection (e.g., types of data to be collected, an amount of data to be collected, a time range for data to be collected, etc.).

In some examples, the analytics request 708 may include an event type, where the event type may be associated with a registration area, a specific network slice, a specific UE, and/or a group of UEs, etc. In other words, the analytics request 708 may indicate a target, a parameter, a range, or a limit in which the coordinate analytics or the raw data is to be collected. For example, the analytics request 708 may request coordinate analytics and/or raw data related to load balancing for a group of UEs, and/or the analytics request 708 may request coordinate analytics and/or raw data related to energy consumption/saving for a specific UE, etc. In some examples, the event type may be based on (or defined by) information from a local configuration, an NRF, or an OAM entity, etc.

At 720, the core network entity 702 may determine a corresponding network entity for collecting data based on the analytics request 708 (e.g., based on the event type associated with the network entity). For example, if the analytics request 708 indicates analytics or raw data associated with a group of UEs is to be collected, the core network entity 702 may determine that the second network entity 706 is a correct or suitable entity for collecting such analytics or raw data.

At 722, if the core network entity 702 determines that the second network entity 706 is a suitable candidate for collecting the data (e.g., at 720), the core network entity 702 may transmit a data collection request 710 to the second network entity 706. The core network entity 702 may include one or more analytics/model IDs and/or one or more parameters associated with raw data collection in the data collection request 710, which may correspond to the analytics/model ID(s) and/or the parameter(s) associated with raw data collection received from the first network entity 704 in the analytics request 708. As such, based at least in part on the analytics/model ID(s) and/or the parameter(s) associated with the raw data collection, the second network entity 706 may determine whether to transmit coordinate analytics and/or raw data in response.

At 724, the second network entity 706 may determine whether a network entity level inference (e.g., a RAN level inference) is specified based on the data collection request 710. If the second network entity 706 determines that a network entity level inference (e.g., a RAN level inference) is specified, the second network entity 706 may initiate the second entity level inference accordingly (e.g., the second network entity 706 may perform AI/ML inference on the request data), and the second network entity 706 may transmit the second entity level inference (e.g., the coordinate analytics) to the core network entity 702. On the other hand, if the second network entity 706 determines that the network entity level inference is not specified, the second network entity may transmit raw data to the core network entity 702.

At 726, in response to the data collection request 710, the second core network entity may transmit a data collection response 712 to the core network entity 702, where the data collection response 712 may include the coordinate analytics (e.g., AI/ML inference of the raw data) and/or the raw data depending on whether the network entity level inference is specified (e.g., determined by the second network entity 706 at 724).

At 728, the core network entity 702 may transmit an analytics response 714 to the first network entity 704 based at least in part on the data collection response 712 received. For example, the analytics response 728 may include coordinate analytics and/or raw data in which the core network entity 702 received from the second network entity 706.

Figure 8:
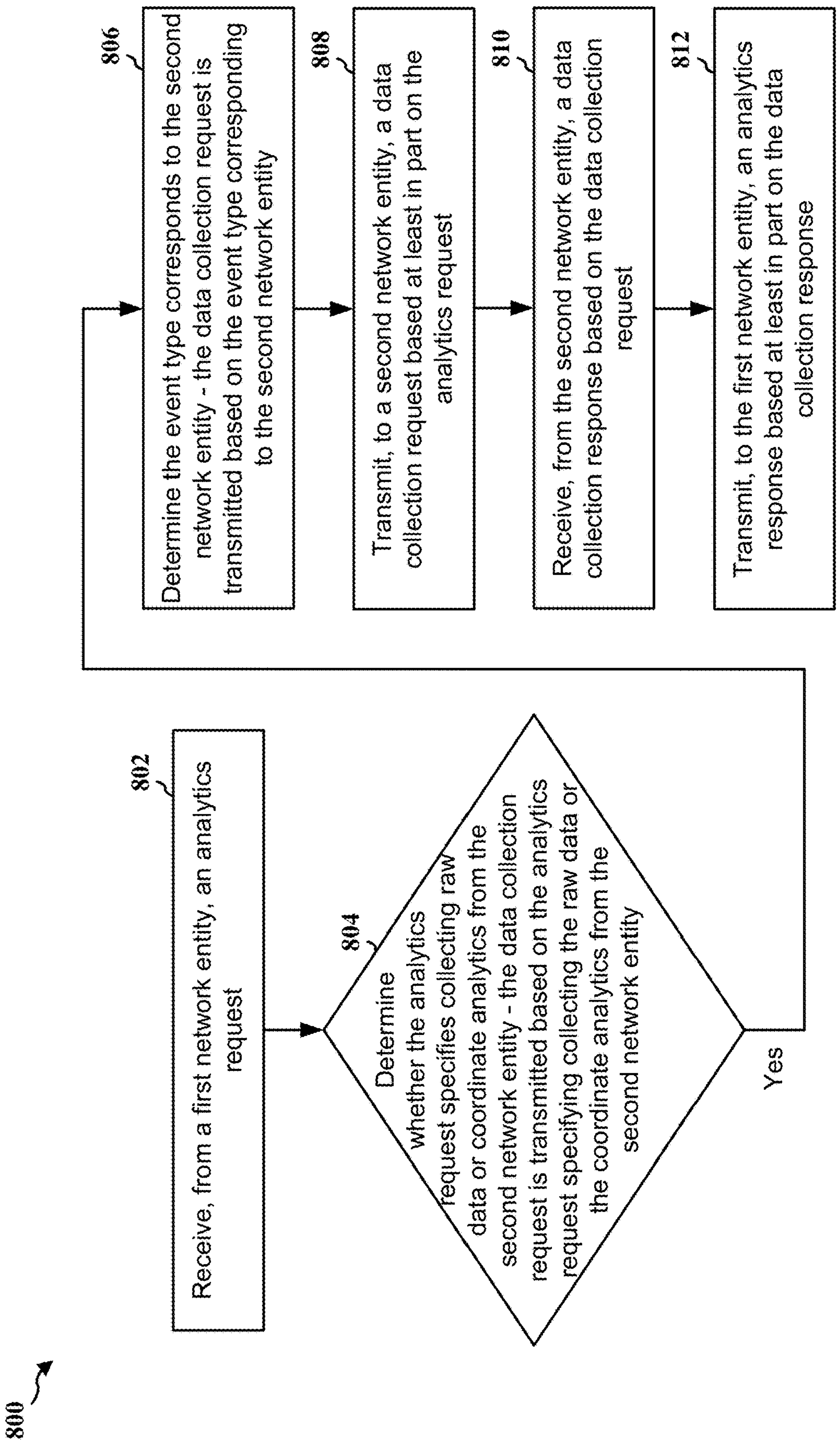
FIG. 8 is a flowchart of a method of wireless communication in accordance with aspects presented herein.

FIG. 8 is a flowchart 800 of a method of wireless communication. The method may be performed by a core network entity or a component of a core network entity (e.g., the base station 102, 180, 310; the core network entity 502, 602, 702; the apparatus 1002; which may include the memory 376 and which may be the entire base station 310 or a component of the base station 310, such as the TX processor 316, the RX processor 370, and/or the controller/processor 375). The method may enable the core network entity to coordinate data collection and/or AI/ML analytics with another network entity (e.g., a RAN).

At 802, a core network entity may receive, from a first network entity, an analytics request, such as described in connection with FIGS. 5 to 7. For example, at 516, the core network entity 502 may receive an analytics request 508 from the first network entity 504. The reception of the analytics request may be performed by, e.g., the analytics request process component 1040 and/or the reception component 1030 of the apparatus 1002 in FIG. 10.

In one example, the analytics request may be associated with at least one of a load balancing, a mobility optimization, or an energy saving.

At 804, the core network entity may determine whether the analytics request specifies collecting raw data or coordinate analytics from a second network entity, such as described in connection with FIGS. 5 to 6. For example, at 518, the core network entity 502 may determine whether the analytics request 508 specifies collecting raw data and/or coordinate analytics from the second network entity 506. The determination of whether the analytics request specifies collecting raw data or coordinate analytics from the second network entity may be performed by, e.g., the collection type determination component 1042 of the apparatus 1002 in FIG. 10.

In one example, the core network entity may be an NWDAF, the second network entity may be a RAN, and the first network entity may include at least one of an AMF, an SMF, a PCF, a UDR, an NEF, one or more AFs, an OAM entity, or one or more data repositories.

In one example, a data collection request may be transmitted based on the analytics request specifying collecting the raw data or the coordinate analytics from the second network entity. For example, if the analytics request specifies collecting the raw data, the core network entity may include one or more parameters associated with the analytics request in the data collection request. In another example, if the analytics request specifies collecting the coordinate analytics, the core network entity may include at least one of an analytics ID or a model ID in the data collection request. In such an example, the core network entity may receive the at least one of the analytics ID or the model ID from the first network entity, and/or the analytics request may include the at least one of the analytics ID or the model ID.

In one example, the analytics request may include an event type that is associated with at least one of a registration area, a specific slice, a specific UE, or a group of UEs.

At 806, the core network entity may determine the event type corresponds to the second network entity, such as described in connection with FIGS. 5 to 7. For example, at 520, the core network entity 502 may determine a corresponding network entity for collecting data based on the analytics request 508 (e.g., based on an event type associated with the network entity). The determination of the event type may be performed by, e.g., the event type determination component 1044 of the apparatus 1002 in FIG. 10. A data collection request may be transmitted based on the event type corresponding to the second network entity.

In one example, the event type may correspond to the second network entity based on information from a local configuration, an NRF, or an OAM entity.

At 808, the core network entity may transmit, to the second network entity, a data collection request based at least in part on the analytics request, such as described in connection with FIGS. 5 to 7. For example, at 522, the core network entity 502 may transmit a data collection request 510 to the second network entity 506. The transmission of the data collection request may be performed by, e.g., the data collection request component 1046 and/or the transmission component 1034 of the apparatus 1002 in FIG. 10.

In one example, the data collection request may include one or more parameters associated with the analytics request.

At 810, the core network entity may receive, from the second network entity, a data collection response based on the data collection request, such as described in connection with FIGS. 5 to 7. For example, at 526, the core network entity 502 may receive a data collection response 512 from the second network entity 506. The reception of the data collection response may be performed by, e.g., the data collection response process component 1048 and/or the reception component 1030 of the apparatus 1002 in FIG. 10.

In another example, the data collection response may be received from the second network entity based on a second network entity level inference.

At 812, the core network entity may transmit, to the first network entity, an analytics response based at least in part on the data collection response, such as described in connection with FIGS. 5 to 7. For example, at 528, the core network entity 502 may transmit an analytics response 514 to the first network entity 504. The transmission of the analytics response may be performed by, e.g., the analytics response component 1050 and/or the transmission component 1034 of the apparatus 1002 in FIG. 10.

Figure 9:
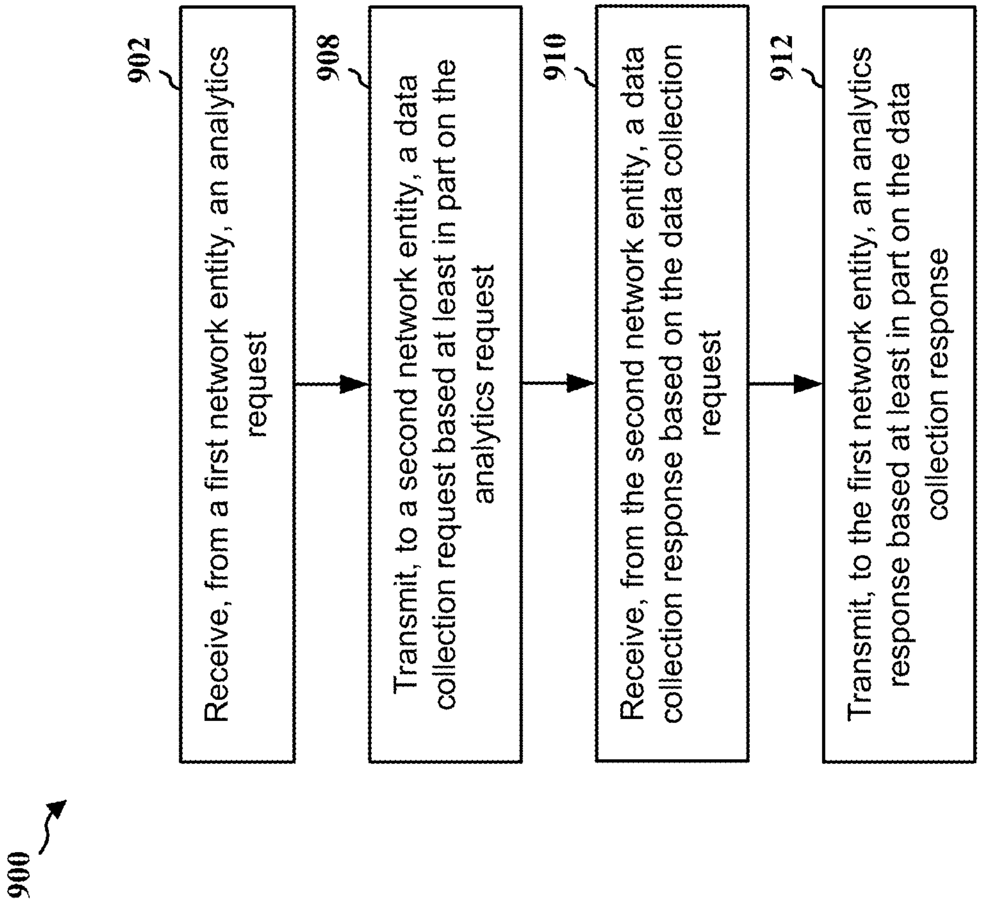
FIG. 9 is a flowchart of a method of wireless communication in accordance with aspects presented herein.

FIG. 9 is a flowchart 900 of a method of wireless communication. The method may be performed by a core network entity or a component of a core network entity (e.g., the base station 102, 180, 310; the core network entity 502, 602, 702; the apparatus 1002; which may include the memory 376 and which may be the entire base station 310 or a component of the base station 310, such as the TX processor 316, the RX processor 370, and/or the controller/processor 375). The method may enable the core network entity to coordinate data collection and/or AI/ML analytics with another network entity (e.g., a RAN).

At 902, a core network entity may receive, from a first network entity, an analytics request, such as described in connection with FIGS. 5 to 7. For example, at 516, the core network entity 502 may receive an analytics request 508 from the first network entity 504. The reception of the analytics request may be performed by, e.g., the analytics request process component 1040 and/or the reception component 1030 of the apparatus 1002 in FIG. 10.

In one example, the analytics request may be associated with at least one of a load balancing, a mobility optimization, or an energy saving.

In another example, the core network entity may determine whether the analytics request specifies collecting raw data or coordinate analytics from a second network entity, such as described in connection with FIGS. 5 to 6. For example, at 518, the core network entity 502 may determine whether the analytics request 508 specifics collecting raw data and/or coordinate analytics from the second network entity 506. The determination of whether the analytics request specifies collecting raw data or coordinate analytics from the second network entity may be performed by, e.g., the collection type determination component 1042 of the apparatus 1002 in FIG. 10.

In another example, the core network entity may be an NWDAF, the second network entity may be a RAN, and the first network entity may include at least one of an AMF, an SMF, a PCF, a UDR, an NEF, one or more AFs, an OAM entity, or one or more data repositories.

In another example, a data collection request may be transmitted based on the analytics request specifying collecting the raw data or the coordinate analytics from the second network entity. For example, if the analytics request specifies collecting the raw data, the core network entity may include one or more parameters associated with the analytics request in the data collection request. In another example, if the analytics request specifies collecting the coordinate analytics, the core network entity may include at least one of an analytics ID or a model ID in the data collection request. In such an example, the core network entity may receive the at least one of the analytics ID or the model ID from the first network entity, and/or the analytics request may include the at least one of the analytics ID or the model ID.

In another example, the analytics request may include an event type that is associated with at least one of a registration area, a specific slice, a specific UE, or a group of UEs. In such an example, the core network entity may determine the event type corresponds to the second network entity, such as described in connection with FIGS. 5 to 7. For example, at 520, the core network entity 502 may determine a corresponding network entity for collecting data based on the analytics request 508 (e.g., based on an event type associated with the network entity). The determination of the event type may be performed by, e.g., the event type determination component 1044 of the apparatus 1002 in FIG. 10. A data collection request may be transmitted based on the event type corresponding to the second network entity.

In another example, the event type may correspond to the second network entity based on information from a local configuration, an NRF, or an OAM entity.

At 908, the core network entity may transmit, to the second network entity, a data collection request based at least in part on the analytics request, such as described in connection with FIGS. 5 to 7. For example, at 522, the core network entity 502 may transmit a data collection request 510 to the second network entity 506. The transmission of the data collection request may be performed by, e.g., the data collection request component 1046 and/or the transmission component 1034 of the apparatus 1002 in FIG. 10.

In one example, the data collection request may include one or more parameters associated with the analytics request.

At 910, the core network entity may receive, from the second network entity, a data collection response based on the data collection request, such as described in connection with FIGS. 5 to 7. For example, at 526, the core network entity 502 may receive a data collection response 512 from the second network entity 506. The reception of the data collection response may be performed by, e.g., the data collection response process component 1048 and/or the reception component 1030 of the apparatus 1002 in FIG. 10.

In one example, the data collection response may be received from the second network entity based on a second network entity level inference.

At 912, the core network entity may transmit, to the first network entity, an analytics response based at least in part on the data collection response, such as described in connection with FIGS. 5 to 7. For example, at 528, the core network entity 502 may transmit an analytics response 514 to the first network entity 504. The transmission of the analytics response may be performed by, e.g., the analytics response component 1050 and/or the transmission component 1034 of the apparatus 1002 in FIG. 10.

Figure 10:
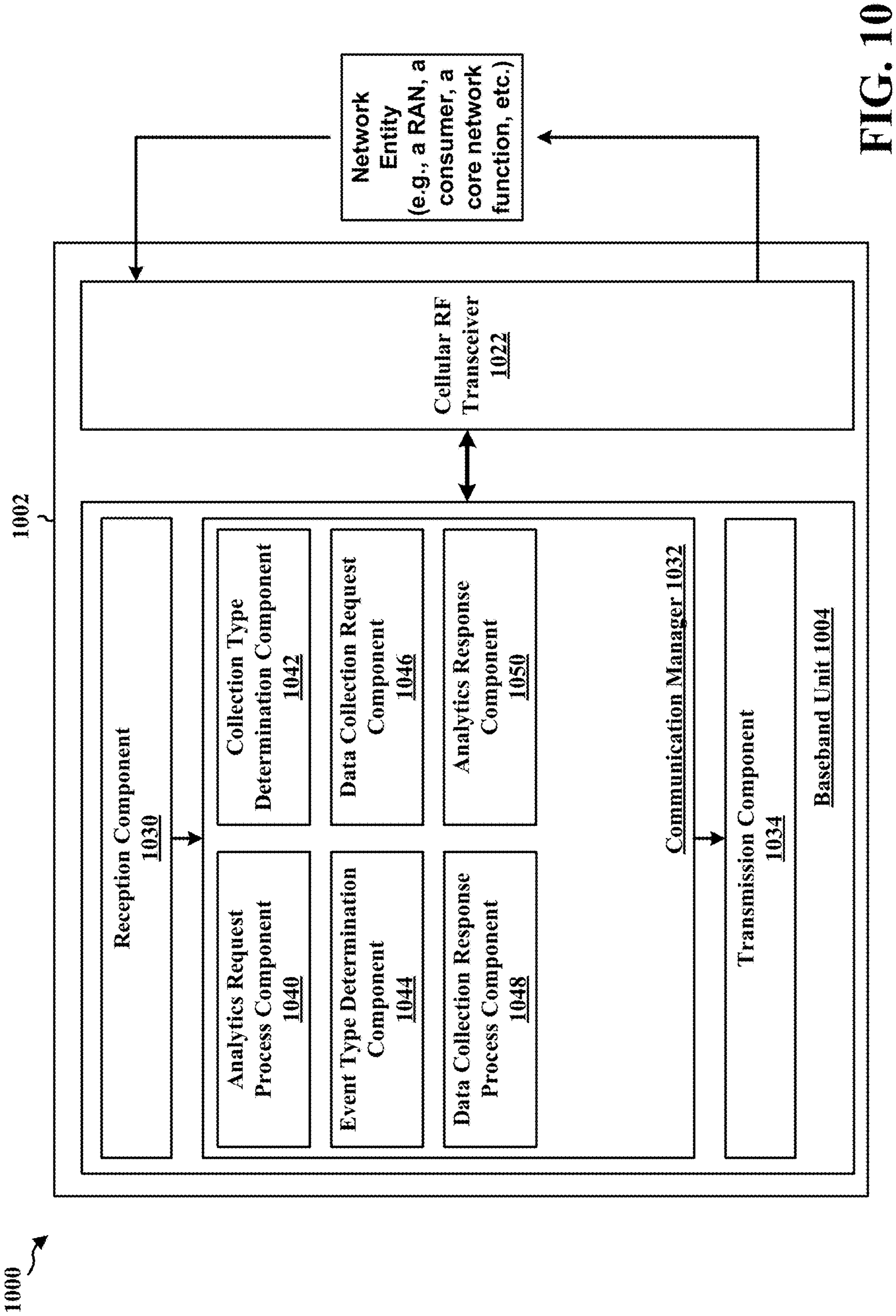
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 may be a core network entity, a component of a core network entity, or may implement core network entity functionality. In some aspects, the apparatus 1002 may include a baseband unit 1004. The baseband unit 1004 may communicate through a cellular RF transceiver 1022 with a network entity or a function associated with a network entity. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an analytics request process component 1040 that is configured to receive, from a first network entity, an analytics request, e.g., as described in connection with 802 of FIG. 8 and/or 902 of FIG. 9. The communication manager 1032 further includes a collection type determination component 1042 that is configured to determine whether the analytics request specifies collecting raw data or coordinate analytics from the second network entity, e.g., as described in connection with 804 of FIG. 8. The communication manager 1032 further includes an event type determination component 1044 that is configured to determine the event type corresponds to the second network entity, e.g., as described in connection with 806 of FIG. 8. The communication manager 1032 further includes a data collection request component 1046 that is configured to transmit, to a second network entity, a data collection request based at least in part on the analytics request, e.g., as described in connection with 808 of FIG. 8 and/or 908 of FIG. 9. The communication manager 1032 further includes a data collection response process component 1048 that is configured to receive, from the second network entity, a data collection response based on the data collection request, e.g., as described in connection with 810 of FIG. 8 and/or 910 of FIG. 9. The communication manager 1032 further includes an analytics response component 1050 that is configured to transmit, to the first network entity, an analytics response based at least in part on the data collection response, e.g., as described in connection with 812 of FIG. 8 and/or 912 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for receiving, from a first network entity, an analytics request (e.g., the analytics request process component 1040 and/or the reception component 1030). The apparatus 1002 includes means for determining whether the analytics request specifies collecting raw data or coordinate analytics from the second network entity (e.g., the collection type determination component 1042). The apparatus 1002 includes means for determining the event type corresponds to the second network entity (e.g., the event type determination component 1044). The apparatus 1002 includes means for transmitting, to a second network entity, a data collection request based at least in part on the analytics request (e.g., the data collection request component 1046 and/or the transmission component 1034). The apparatus 1002 includes means for receiving. from the second network entity, a data collection response based on the data collection request (e.g., the data collection response process component 1048 and/or the reception component 1030). The apparatus 1002 includes means for transmitting, to the first network entity, an analytics response based at least in part on the data collection response (e.g., the analytics response component 1050 and/or the transmission component 1034).

In one configuration, the analytics request may be associated with at least one of a load balancing, a mobility optimization, or an energy saving.

In another configuration, the core network entity may be an NWDAF, the second network entity may be a RAN, and the first network entity may include at least one of an AMF, an SMF, a PCF, a UDR, an NEF, one or more AFs, an OAM entity, or one or more data repositories.

In another configuration, a data collection request may be transmitted based on the analytics request specifying collecting the raw data or the coordinate analytics from the second network entity. In such a configuration, if the analytics request specifies collecting the raw data, the core network entity may include one or more parameters associated with the analytics request in the data collection request. In such a configuration, if the analytics request specifies collecting the coordinate analytics, the core network entity may include at least one of an analytics ID or a model ID in the data collection request. In such a configuration, the core network entity may receive the at least one of the analytics ID or the model ID from the first network entity, and/or the analytics request may include the at least one of the analytics ID or the model ID.

In another configuration, the analytics request may include an event type that is associated with at least one of a registration area, a specific slice, a specific UE, or a group of UEs.

In another configuration, the event type may correspond to the second network entity based on information from a local configuration, an NRF, or an OAM entity.

In another configuration, the data collection request may include one or more parameters associated with the analytics request.

In another configuration, the data collection response may be received from the second network entity based on a second network entity level inference.

The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 11:
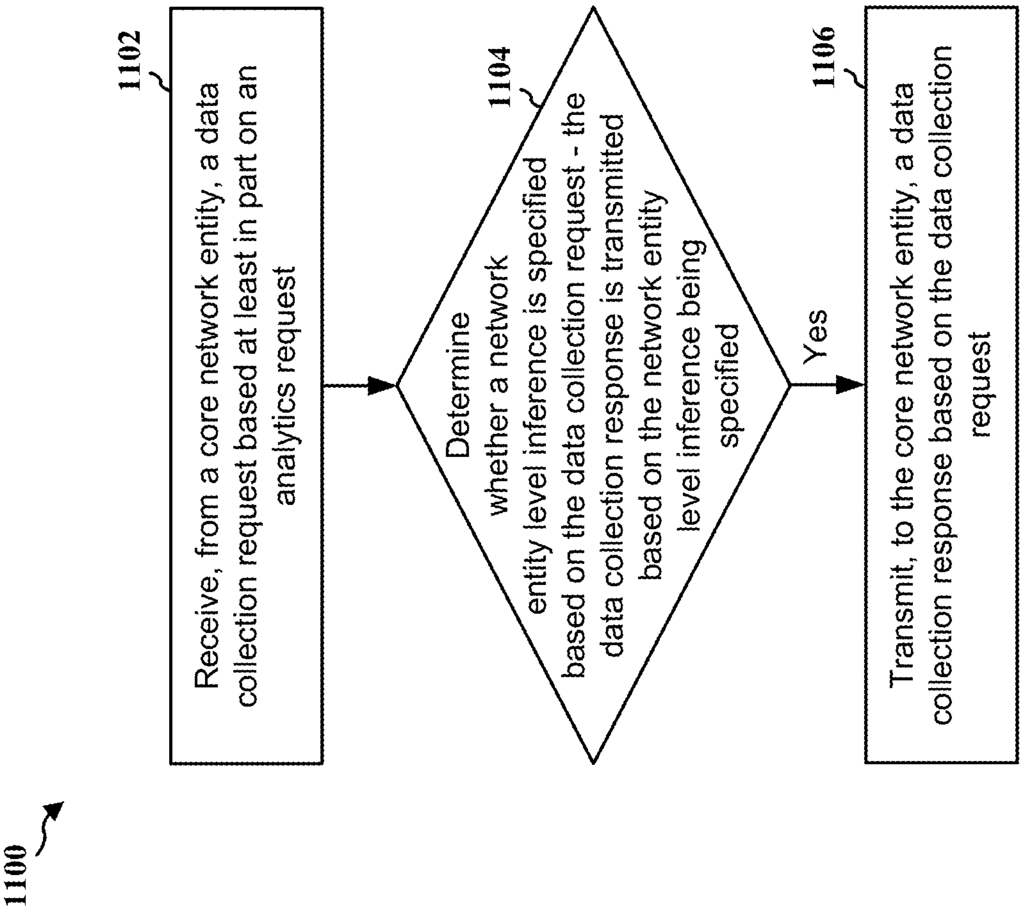
FIG. 11 is a flowchart of a method of wireless communication in accordance with aspects presented herein.

FIG. 11 is a flowchart 1100 of a method of wireless communication. The method may be performed by a network entity or a component of a network entity (e.g., the base station 102, 180, 310; the second network entity 506, 606, 706; the apparatus 1302; which may include the memory 376 and which may be the entire base station 310 or a component of the base station 310, such as the TX processor 316, the RX processor 370, and/or the controller/processor 375). The method may enable the network entity to coordinate data collection and/or AI/ML analytics with a core network entity (e.g., an NWDAF).

At 1102, a network entity may receive, from a core network entity, a data collection request based at least in part on an analytics request, such as described in connection with FIGS. 5 to 7. For example, at 522, the second network entity 506 may receive the data collection request 510 from the core network entity 502. The reception of the data collection request may be performed by, e.g., the data collection request process component 1340 and/or the reception component 1330 of the apparatus 1302 in FIG. 13.

In one example, the network entity may be a RAN and the core network entity may be an NWDAF.

In another example, the data collection request may be associated with at least one of a load balancing, a mobility optimization, or an energy saving.

In another example, the data collection request may indicate whether raw data or coordinate analytics is to be collected from the network entity. In such an example, if the data collection request indicates the raw data is to be collected from the network entity, the data collection request may include one or more parameters associated with the analytics request. If the data collection request indicates the coordinate analytics is to be collected from the network entity, the data collection request includes at least one of an analytics ID or a model ID.

At 1104, the network entity may determine whether a network entity level inference is specified based on the data collection request, where the data collection response may be transmitted based on the network entity level inference being specified, such as described in connection with FIGS. 5 and 7. For example, at 524, the second network entity 506 may determine whether a network entity level inference is specified based on the data collection request 510. The determination of whether a network entity level inference is specified may be performed by, e.g., the network inference determination component 1342 of the apparatus 1302 in FIG. 13.

At 1106, the network entity may transmit, to the core network entity, a data collection response based on the data collection request, such as described in connection with FIGS. 5 to 7. For example, at 526, the second network entity 506 may transmit a data collection response 512 to the core network entity 502. The transmission of the data collection response may be performed by, e.g., the data collection response component 1344 and/or the transmission component 1334 of the apparatus 1302 in FIG. 13.

Figure 12:
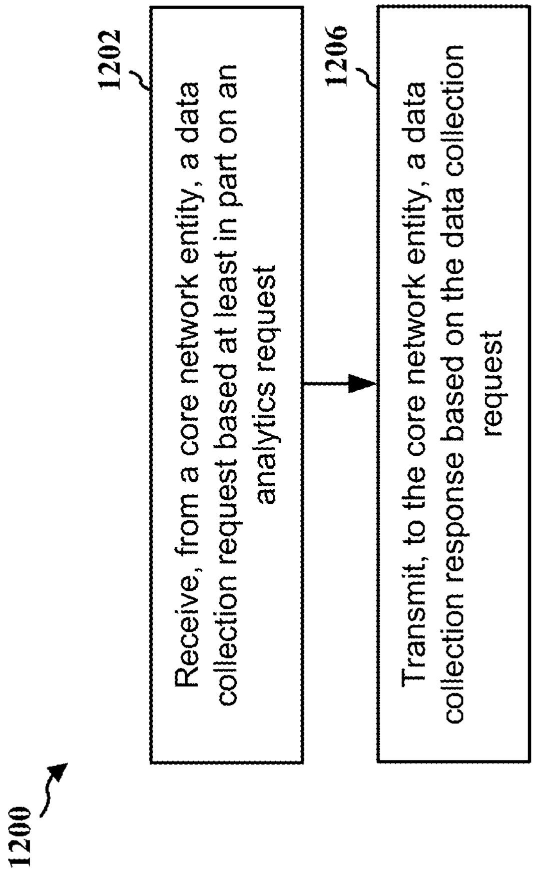
FIG. 12 is a flowchart of a method of wireless communication in accordance with aspects presented herein.

FIG. 12 is a flowchart 1200 of a method of wireless communication. The method may be performed by a network entity or a component of a network entity (e.g., the base station 102, 180, 310; the second network entity 506, 606, 706; the apparatus 1302; which may include the memory 376 and which may be the entire base station 310 or a component of the base station 310, such as the TX processor 316, the RX processor 370, and/or the controller/processor 375). The method may enable the network entity to coordinate data collection and/or AI/ML analytics with a core network entity (e.g., an NWDAF).

At 1202, a network entity may receive, from a core network entity, a data collection request based at least in part on an analytics request, such as described in connection with FIGS. 5 to 7. For example, at 522, the second network entity 506 may receive the data collection request 510 from the core network entity 502. The reception of the data collection request may be performed by, e.g., the data collection request process component 1340 and/or the reception component 1330 of the apparatus 1302 in FIG. 13.

In one example, the network entity may be a RAN and the core network entity may be an NWDAF.

In another example, the data collection request may be associated with at least one of a load balancing, a mobility optimization, or an energy saving.

In another example, the data collection request may indicate whether raw data or coordinate analytics is to be collected from the network entity. In such an example, if the data collection request indicates the raw data is to be collected from the network entity, the data collection request may include one or more parameters associated with the analytics request. If the data collection request indicates the coordinate analytics is to be collected from the network entity, the data collection request includes at least one of an analytics ID or a model ID.

In another example, the network entity may determine whether a network entity level inference is specified based on the data collection request, where the data collection response may be transmitted based on the network entity level inference being specified, such as described in connection with FIGS. 5 and 7. For example, at 524, the second network entity 506 may determine whether a network entity level inference is specified based on the data collection request 510. The determination of whether a network entity level inference is specified may be performed by, e.g., the network inference determination component 1342 of the apparatus 1302 in FIG. 13.

At 1206, the network entity may transmit, to the core network entity, a data collection response based on the data collection request, such as described in connection with FIGS. 5 to 7. For example, at 526, the second network entity 506 may transmit a data collection response 512 to the core network entity 502. The transmission of the data collection response may be performed by, e.g., the data collection response component 1344 and/or the transmission component 1334 of the apparatus 1302 in FIG. 13.

Figure 13:
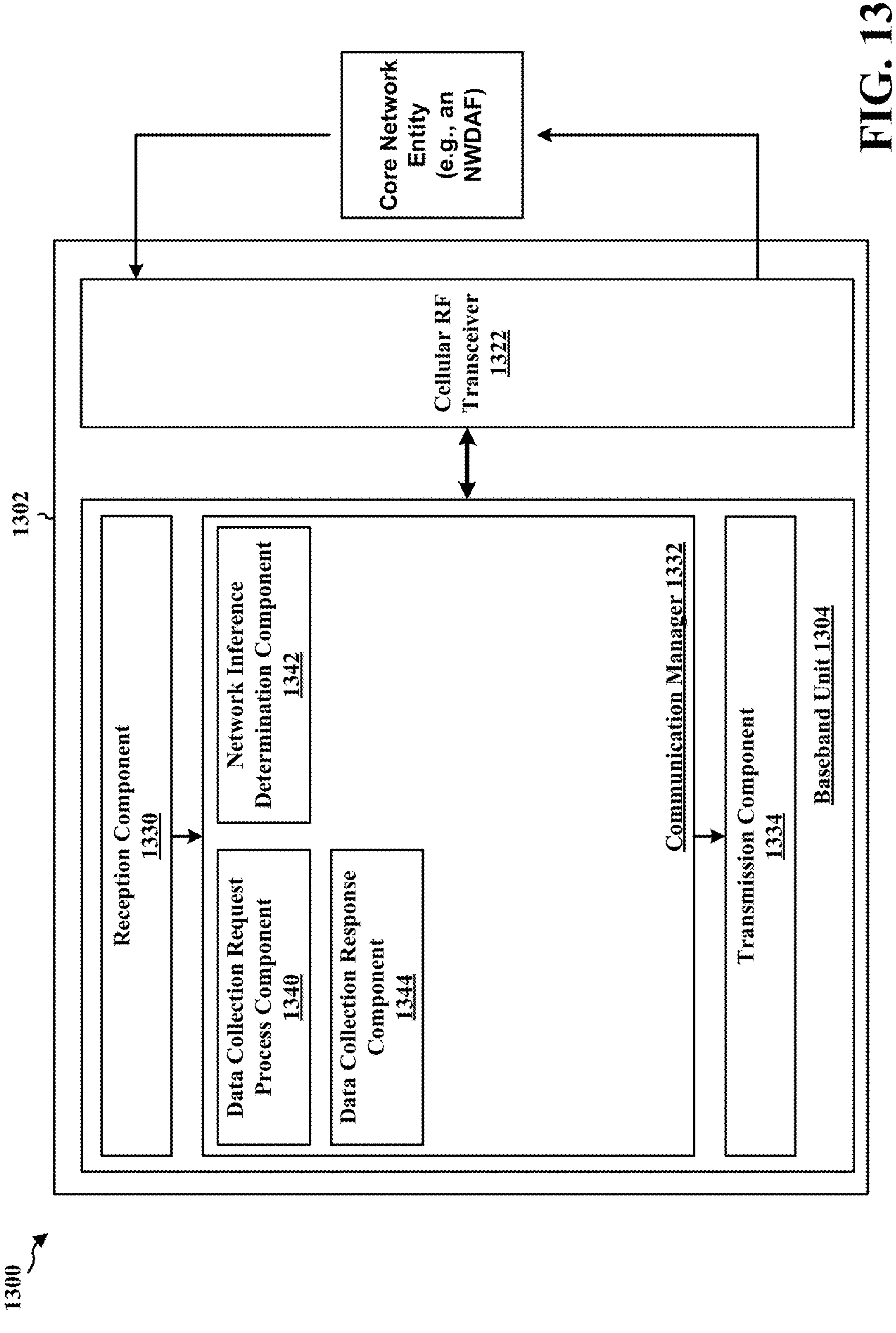
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be a network entity, a component of a network entity, or may implement network entity functionality. In some aspects, the apparatus 1302 may include a baseband unit 1304. The baseband unit 1304 may communicate through a cellular RF transceiver 1322 with a core network entity or a function associated with a core network entity. The baseband unit 1304 may include a computer-readable medium/memory. The baseband unit 1304 is responsible for general processing, including the execution of software stored on the computer-readable medium/memory. The software, when executed by the baseband unit 1304. causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a data collection request process component 1340 that is configured to receive, from a core network entity, a data collection request based at least in part on an analytics request, e.g., as described in connection with 1102 of FIG. 11 and/or 1202 of FIG. 12. The communication manager 1332 further includes a network inference determination component 1342 that is configured to determine whether a network entity level inference is specified based on the data collection request, where the data collection response is transmitted based on the network entity level inference being specified, e.g., as described in connection with 1104 of FIG. 11. The communication manager 1332 further includes a data collection response component 1344 that is configured to transmit, to the core network entity, a data collection response based on the data collection request, e.g., as described in connection with 1106 of FIG. 11 and/or 1206 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for receiving, from a core network entity, a data collection request based at least in part on an analytics request (e.g., the data collection request process component 1340 and/or the reception component 1330). The apparatus 1302 includes means for determining whether a network entity level inference is specified based on the data collection request (e.g., the network inference determination component 1342). The apparatus 1302 includes means for transmitting. to the core network entity, a data collection response based on the data collection request (e.g., the data collection response component 1344 and/or the transmission component 1334).

In one configuration, the network entity may be a RAN and the core network entity may be an NWDAF.

In another configuration, the data collection request may be associated with at least one of a load balancing, a mobility optimization, or an energy saving.

In another configuration, the data collection request may indicate whether raw data or coordinate analytics is to be collected from the network entity. In such a configuration, if the data collection request indicates the raw data is to be collected from the network entity, the data collection request may include one or more parameters associated with the analytics request. If the data collection request indicates the coordinate analytics is to be collected from the network entity, the data collection request includes at least one of an analytics ID or a model ID.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a first network entity, an analytics request; transmit, to a second network entity, a data collection request based at least in part on the analytics request; receive, from the second network entity, a data collection response based on the data collection request; and transmit, to the first network entity, an analytics response based at least in part on the data collection response.

Aspect 2 is the apparatus of aspect 1, where the core network entity is an NWDAF and the second network entity is a RAN.

Aspect 3 is the apparatus of any of aspects 1 and 2, where the first network entity includes at least one of an AMF, an SMF, a PCF, a UDR, an NEF, one or more AFs, an OAM entity, or one or more data repositories.

Aspect 4 is the apparatus of any of aspects 1 to 3, where the analytics request is associated with at least one of a load balancing, a mobility optimization, or an energy saving.

Aspect 5 is the apparatus of any of aspects 1 to 4, where the at least one processor is further configured to: determine whether the analytics request specifies collecting raw data or coordinate analytics from the second network entity; where the data collection request is transmitted based on the analytics request specifying collecting the raw data or the coordinate analytics from the second network entity.

Aspect 6 is the apparatus of any of aspects 1 to 5, where the analytics request specifies collecting the raw data, the at least one processor is further configured to: include one or more parameters associated with the analytics request in the data collection request.

Aspect 7 is the apparatus of any of aspects 1 to 6, where the analytics request specifies collecting the coordinate analytics, the at least one processor is further configured to: include at least one of an ID or a model ID in the data collection request.

Aspect 8 is the apparatus of any of aspects 1 to 7, where the at least one processor is further configured to: receive the at least one of the analytics ID or the model ID from the first network entity.

Aspect 9 is the apparatus of any of aspects 1 to 8, where the analytics request includes the at least one of the analytics ID or the model ID.

Aspect 10 is the apparatus of any of aspects 1 to 9, where the data collection request includes one or more parameters associated with the analytics request.

Aspect 11 is the apparatus of any of aspects 1 to 10, where the data collection response is received from the second network entity based on a second network entity level inference.

Aspect 12 is the apparatus of any of aspects 1 to 11, where the analytics request includes an event type that is associated with at least one of a registration area, a specific slice, a specific UE, or a group of UEs.

Aspect 13 is the apparatus of any of aspects 1 to 12, where the at least one processor is further configured to: determine the event type corresponds to the second network entity; where the data collection request is transmitted based on the event type corresponding to the second network entity.

Aspect 14 is the apparatus of any of aspects 1 to 13, where the event type corresponds to the second network entity based on information from a local configuration, an NRF, or an OAM entity.

Aspect 15 is the apparatus of any of aspects 1 to 14, further including a transceiver coupled to the at least one processor.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

Aspect 19 is an apparatus for wireless communication including at least one processor coupled to a memory and configured to receive, from a core network entity, a data collection request based at least in part on an analytics request; and transmit, to the core network entity, a data collection response based on the data collection request.

Aspect 20 is the apparatus of aspect 19, where the network entity is a RAN and the core network entity is an NWDAF.

Aspect 21 is the apparatus of any of aspects 19 and 20, where the data collection request is associated with at least one of a load balancing, a mobility optimization, or an energy saving.

Aspect 22 is the apparatus of any of aspects 19 to 21, where the data collection request indicates whether raw data or coordinate analytics is to be collected from the network entity.

Aspect 23 is the apparatus of any of aspects 19 to 22, where if the data collection request indicates the raw data is to be collected from the network entity, the data collection request includes one or more parameters associated with the analytics request.

Aspect 24 is the apparatus of any of aspects 19 to 23, where if the data collection request indicates the coordinate analytics is to be collected from the network entity, the data collection request includes at least one of an analytics ID or a model ID.

Aspect 25 is the apparatus of any of aspects 19 to 24, where the at least one processor is further configured to:

determine whether a network entity level inference is specified based on the data collection request; where the data collection response is transmitted based on the network entity level inference being specified.

Aspect 26 is the apparatus of any of aspects 19 to 25, further including a transceiver coupled to the at least one processor.

Aspect 27 is a method of wireless communication for implementing any of aspects 19 to 26.

Aspect 28 is an apparatus for wireless communication including means for implementing any of aspects 19 to 26.

Aspect 29 is a computer-readable medium storing computer executable code, where the code when executed by a processor causes the processor to implement any of aspects 19 to 26.

What is claimed is:

1. An apparatus for wireless communication at a network data analytics function (NWDAF), comprising:

at least one memory; and at least one processor coupled to the at least one memory and configured to:

receive, from a network entity, an analytics request, wherein the analytics request includes at least one of: (i) one or more analytics identifiers (IDs) or one or more model IDs associated with coordinate analytics to be collected from a radio access network (RAN), or (ii) one or more parameters associated with raw data collection from the RAN;

transmit, to the RAN, a data collection request including at least one of the one or more analytics IDs, the one or more model IDs, or the one or more parameters based on a determination that the analytics request specifies collecting the raw data, the coordinate analytics, or both from the RAN;

receive, from the RAN based on the data collection request, a data collection response including the raw data, the coordinate analytics, or both; and transmit, to the network entity, an analytics response based at least in part on the data collection response.

2. The apparatus of claim 1, wherein the network entity includes at least one of an access and mobility management function (AMF), a session management function (SMF), a policy control function (PCF), a unified data repository (UDR), a network exposure function (NEF), one or more application functions (AFs), an operations, administration and maintenance (OAM) entity, or one or more data repositories.

3. The apparatus of claim 1, wherein the analytics request is associated with at least one of a load balancing, a mobility optimization, or an energy saving.

4. The apparatus of claim 1, wherein the at least one processor is further configured to:

determine whether the analytics request specifies collecting the raw data or the coordinate analytics from the RAN.

5. The apparatus of claim 1, wherein the analytics request includes the one or more parameters associated with the analytics request in the data collection request.

6. The apparatus of claim 1, wherein the analytics request includes at least one of the one or more analytics IDs or the one or more model IDs in the data collection request.

7. The apparatus of claim 1, wherein the at least one processor is further configured to:

receive the at least one of the one or more analytics IDs or the one or more model IDs from the network entity.

8. The apparatus of claim 1, wherein the data collection request includes a set of parameters associated with the analytics request.

9. The apparatus of claim 1, wherein the data collection response is received from the RAN based on a RAN level inference.

10. The apparatus of claim 1, wherein the analytics request includes an event type that is associated with at least one of a registration area, a specific slice, a specific user equipment (UE), or a group of UEs.

11. The apparatus of claim 10, wherein the at least one processor is further configured to:

determine the event type corresponds to the RAN;

wherein the data collection request is transmitted based on the event type corresponding to the RAN.

12. The apparatus of claim 11, wherein the event type corresponds to the RAN based on information from a local configuration, a network repository function (NRF), or an operations, administration and maintenance (OAM) entity.

13. The apparatus of claim 1, further comprising a transceiver coupled to the at least one processor.

14. A method of wireless communication at a network data analytics function (NWDAF), comprising:

receiving, from a network entity, an analytics request, wherein the analytics request includes at least one of: (i) one or more analytics identifiers (IDs) or one or more model IDs associated with coordinate analytics to be collected from a radio access network (RAN), or (ii) one or more parameters associated with raw data collection from the RAN;

transmitting, to the RAN, a data collection request including at least one of the one or more analytics IDs, the one or more model IDs, or the one or more parameters based on a determination that the analytics request specifies collecting the raw data, the coordinate analytics, or both from the RAN;

receiving, from the RAN based on the data collection request, a data collection response including the raw data, the coordinate analytics, or both; and transmitting, to the network entity, an analytics response based at least in part on the data collection response.

15. The method of claim 14, further comprising:

determining whether the analytics request specifies collecting the raw data or the coordinate analytics from the RAN.

16. The method of claim 15, wherein the analytics request includes an event type that is associated with at least one of a registration area, a specific slice, a specific user equipment (UE), or a group of UEs.

17. The method of claim 16, further comprising:

determining the event type corresponds to the RAN;

wherein the data collection request is transmitted based on the event type corresponding to the RAN.

18. An apparatus for wireless communication at a radio access network (RAN), comprising:

at least one memory; and at least one processor coupled to the at least one memory and configured to:

receive, from a network data analytics function (NWDAF), a data collection request based at least in part on an analytics request, wherein the data collection request includes at least one of: (i) one or more analytics identifiers (IDs) or one or more model IDs associated with coordinate analytics to be collected from the RAN, or (ii) one or more parameters associated with raw data collection from the RAN; and transmit, to the NWDAF based on the data collection request, a data collection response including the raw data, the coordinate analytics, or both.

19. The apparatus of claim 18, wherein the data collection request is associated with at least one of a load balancing, a mobility optimization, or an energy saving.

20. The apparatus of claim 18, wherein the data collection request indicates whether the raw data or the coordinate analytics is to be collected from the RAN.

21. The apparatus of claim 20, wherein the data collection request includes the one or more parameters associated with the analytics request.

22. The apparatus of claim 20, wherein the data collection request includes at least one of the one or more analytics IDs or the one or more model IDs.

23. The apparatus of claim 18, wherein the at least one processor is further configured to:

determine whether a RAN level inference is specified based on the data collection request;

wherein the data collection response is transmitted based on the RAN level inference being specified.

24. The apparatus of claim 18, further comprising a transceiver coupled to the at least one processor.

25. A method of wireless communication at a radio access network (RAN), comprising:

receiving, from a network data analytics function (NWDAF), a data collection request based at least in part on an analytics request, wherein the data collection request includes at least one of: (i) one or more analytics identifiers (IDs) or one or more model IDs associated with coordinate analytics to be collected from the RAN, or (ii) one or more parameters associated with raw data collection from the RAN; and transmitting, to the NWDAF based on the data collection request, a data collection response including the raw data, the coordinate analytics, or both.

26. The method of claim 25, wherein the data collection request indicates whether the raw data or the coordinate analytics is to be collected from the RAN.

27. The method of claim 25, further comprising:

determining whether a RAN level inference is specified based on the data collection request;

wherein the data collection response is transmitted based on the RAN level inference being specified.

* * * * *